(12) United States Patent
Lee et al.

(10) Patent No.: US 8,619,520 B2
(45) Date of Patent: Dec. 31, 2013

(54) LENS DRIVING UNIT FOR OPTICAL PICKUP AND OPTICAL DISC DRIVE INCLUDING THE LENS DRIVING UNIT

(75) Inventors: Young-bin Lee, Suwon-si (KR); Soo-hyun Baek, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/564,780

(22) Filed: Aug. 2, 2012

(65) Prior Publication Data
US 2013/0114388 A1 May 9, 2013

(30) Foreign Application Priority Data
Nov. 8, 2011 (KR) .................. 10-2011-0115920

(51) Int. Cl.
*G11B 7/00* (2006.01)
(52) U.S. Cl.
USPC .............. 369/44.14; 369/44.15; 369/44.32; 369/44.23; 369/44.37
(58) Field of Classification Search
None
See application file for complete search history.

(56) References Cited

U.S. PATENT DOCUMENTS

| | | | |
|---|---|---|---|
| 7,606,119 B2 * | 10/2009 | Chao et al. | 369/44.15 |
| 2005/0007906 A1 * | 1/2005 | Horinouchi et al. | 369/44.37 |
| 2005/0195702 A1 * | 9/2005 | Hong et al. | 369/44.14 |
| 2006/0077780 A1 * | 4/2006 | Yamada et al. | 369/44.14 |
| 2006/0146661 A1 * | 7/2006 | Ke et al. | 369/44.14 |
| 2007/0076540 A1 * | 4/2007 | Chao et al. | 369/44.16 |
| 2008/0159090 A1 * | 7/2008 | Kurokawa et al. | 369/44.23 |
| 2008/0239929 A1 * | 10/2008 | Sasaki et al. | 369/112.24 |
| 2009/0116129 A1 * | 5/2009 | Ochi et al. | 359/814 |

FOREIGN PATENT DOCUMENTS

| KR | 10-2005-0022263 | 3/2005 |
|---|---|---|
| KR | 10-0505673 | 8/2005 |
| KR | 10-2009-0010511 | 1/2009 |

* cited by examiner

*Primary Examiner* — Van Chow
(74) *Attorney, Agent, or Firm* — NSIP Law (57) ABSTRACT

Provided is a lens driving unit for an optical pickup and an optical disc drive employing the lens driving unit. First and second driving coils are directly wound around a coil winding unit included in the lens frame, which is different from a conventional lens frame in which a driving coil is manufactured as a separate element and is separately attached to a lens frame.

16 Claims, 6 Drawing Sheets

LENS DRIVING UNIT FOR OPTICAL PICKUP AND OPTICAL DISC DRIVE INCLUDING THE LENS DRIVING UNIT

CROSS-REFERENCE TO RELATED APPLICATION(S)

This application claims the benefit under 35 USC §119(a) of Korean Patent Application No. 10-2011-0115920, filed on Nov. 8, 2011, in the Korean Intellectual Property Office, the entire disclosure of which is incorporated herein by reference for all purposes.

BACKGROUND

1. Field

The following description relates to a lens driving unit for an optical pickup, and more particularly, to a magnetic circuit of an actuator of a lens driving unit.

2. Description of Related Art

A typical object lens driving unit of an optical pickup has a voice coil motor (VCM). The object lens driving unit has a static structure, including a permanent magnet and a yoke, and has a moving structure, including a driving coil and an object lens. In general, the moving structure is supported by a plurality of suspension wires. The suspension wires have an electrical connection function for applying a driving voltage to a driving coil to control focusing and tracking of a lens.

In order to properly fit therein, an optical pickup for a slim-type optical disc drive that is used for a notebook computer needs to have a limited thickness. The limit on thickness leads to a limit on the amount of weight and parts that can be used for the optical pickup. Accordingly, the optical pickup typically has a low strength. For example, the optical pickup for a slim-type optical disc drive may be formed of light material because a higher driving current is required as a weight of a lens frame is increased. Typically an optical pickup is formed of a light plastic.

However, a lens frame formed of a light plastic is structurally unsound and may warp easily due to concentrated electromagnetic force and tracking electromagnetic force applied diagonally to the lens frame. The warpage of the lens frame may result in malfunction such as tracking and focusing delays.

SUMMARY

In an aspect, there is provided a lens driving unit including a lens frame comprising four side surfaces and an object lens that is disposed on a top surface of the lens frame, a pair of first driving coils that are wound around a first side surface of the lens frame, a pair of second driving coils that are wound around a third side surface facing the first side surface of the lens frame, a plurality of suspension wires which are electrically connected to the pair of first driving coils and the pair of second driving coils, a yoke comprising a plurality of magnets fixed thereto which correspond to the first and second driving coils, and a wire holder to which one side of the yoke and to which the suspension wires are fixed.

The lens driving unit may further comprise a coil winding unit in which the pair of first driving coils and the pair of second driving coils are wound around the first and third side surfaces.

The coil winding unit may be integrally formed in the lens frame.

The pair of first driving coils and the pair of second driving coils may be a tracking coil and a focusing coil, respectively.

The first and third side surfaces of the lens frame may have relatively large widths in comparison to the second and fourth side surfaces.

The lens frame may correspond to a slim-type optical disc drive.

In aspect, there is provided an optical disc drive including an object lens configured to face an optical recording medium, a light source configured to emit light toward the object lens, a light-receiving device configured to receive light reflected by the optical recording medium, a base for supporting the lens driving unit, the light source, and the light-receiving device, and a lens driving unit comprising a lens frame comprising four side surfaces and a top surface in which the object lens is disposed, a pair of first driving coils wound around a first side surface of the lens frame, a pair of second driving coils wound around a third side surface of the lens frame, a plurality of suspension wires which are electrically connected to the pair of first driving coils and the pair of second driving coils, a yoke comprising a plurality of magnets fixed thereto which correspond to the pairs of first and second driving coils, and a wire holder to which one side of the yoke and to which the suspension wires are fixed.

The optical disc drive may further comprise a coil winding unit in which the pair of first driving coils and the pair of second driving coils are wound around the first and third side surfaces.

The coil winding unit may be integrally formed in the lens frame.

The pair of first driving coils and the pair of second driving coils may be a tracking coil and a focusing coil, respectively.

The first and third side surfaces may have relatively large widths in comparison to the second and fourth side surfaces.

The lens frame may correspond to a slim-type optical disc drive.

In an aspect, there is provided an optical lens driving unit for driving an optical lens in an optical disc drive, the optical lens driving unit including a lens frame comprising the optical lens on a top surface, a first plurality of winding units on a first outer surface, and a second plurality of windings on a second outer surface, first driving coils wound around the first plurality of windings on the first outer surface of the lens frame, second driving coils wound around the second plurality of windings on the second outer surface of the lens frame, and a holder that comprises a plurality of suspension wires fixed thereto which are electrically connected to the first driving coils and the second driving coils.

The optical lens driving unit may further comprise a yoke that comprises a first inner surface that faces the first outer surface of the lens frame, a second inner surface that faces the second inner surface of the lens frame, and a connector that fixes the yoke to the holder.

The first inner surface of the yoke may comprise a first plurality of magnets which face the first driving coils, and the second inner surface of the yoke may comprise second plurality of magnets which face the second driving coils.

The first driving coils and the first plurality of magnets may perform focusing control of the optical lens, and the second driving coils and the second plurality of magnets may perform tracking control of the optical lens, or vice versa.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
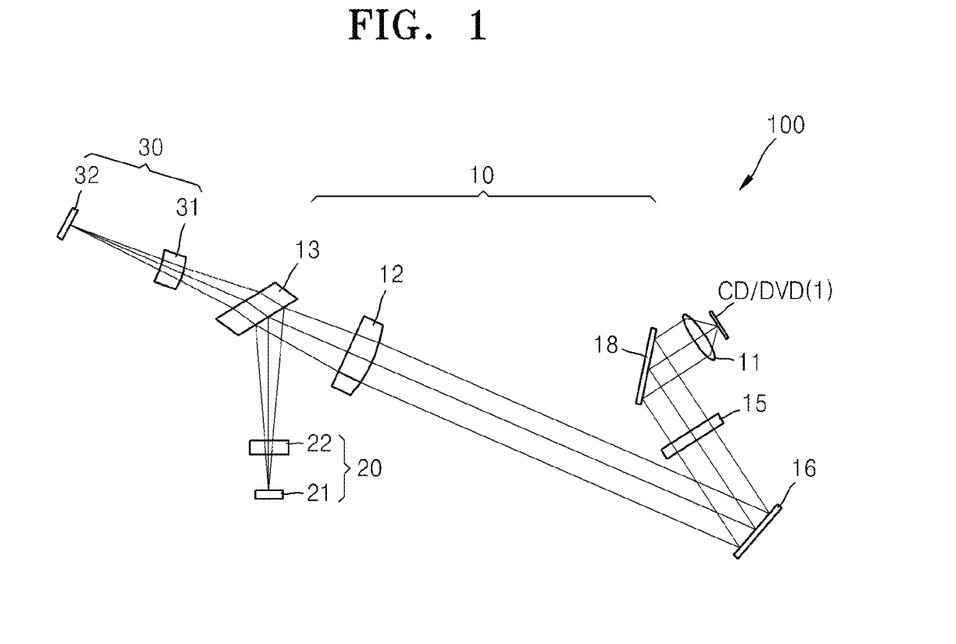
FIG. 1 is a diagram illustrating an example of an optical structure of an optical pickup.

FIG. 1 illustrates an example of an optical pickup 100 for a slim-type optical disc drive, for example, that may be included in a laptop computer, a notebook computer, and the like. As another example, the slim-type optical disc drive may be included in a television, a game console, a tablet, a Blu-ray player, a CD/DVD player, and the like.

Referring to FIG. 1, the optical pickup 100 includes an optical transmission system 10, a light source system 20, and a light-receiving system 30. The optical transmission system 10 directly corresponds to a medium 1 such as a compact disc (CD) or a digital video versatile disc (DVD). The light source system 20 may provide a plurality of beams, for example, a main beam positioned in the center of three beams and first to second sub-beams at both sides of the main beam to reproduce/record information from/in the medium 1. The light-receiving system 30 may generate an electrical signal, such as a data signal or a tracking error signal (TES), for processing by a light-receiving device 32 which may have three light-receiving cells receiving three corresponding beams reflected by the medium 1. The light-receiving system 30 may generate the electrical signals to reproduce information and a TES (Tracking Error Signal).

The light source system 20 includes a light source 21 for a CD or a DVD and a diffraction device 22. In this example, a beam from the light source 21 is incident on a beam splitter 13 via the diffraction device 22. The diffraction device 22 may generate a main beam and two sub-beams by diffracting a single beam from the light source 21. In another aspect, the light source system 20 may also include a light source and other optics for a Blu-ray disc.

The light-receiving system 30 includes the light-receiving device 32 that may generate an electrical signal by detecting the three beams reflected by the medium 1 and passing through the beam splitter 13. The light receiving system also includes a sensing lens 31 for collecting the main beam and the first and second sub-beams with an appropriate size with respect to the light-receiving device 32.

The optical transmission system 10 includes an object lens 11 corresponding to the medium 1, path change mirrors 16 and 18, a quarter wave plate (QWP) 15, a collimating lens 12, and the beam splitter 13. The beam splitter 13 may reflect the three beams from the light source system 20 toward the object lens 11 and transmits light reflected by medium 1 so as to be incident on the light-receiving system 30.

While the optical pickup 100 in FIG. 1 includes optics for a CD/DVD, it should be appreciated that the optical pickup 100 may include optics for a Blu-ray, and the like.

Figure 2:
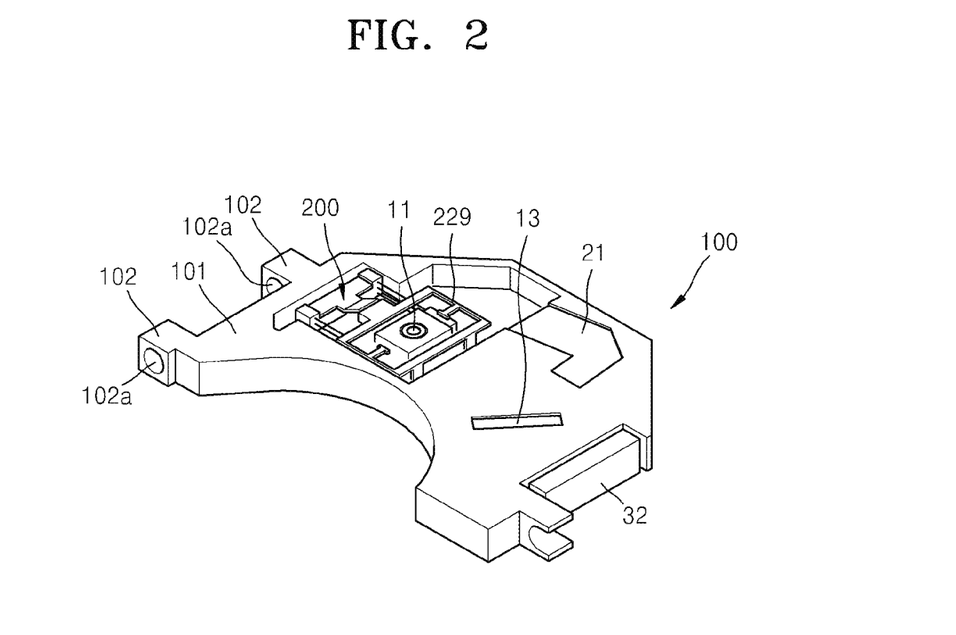
FIG. 2 is a diagram illustrating an example of the optical pickup of FIG. 1.

FIG. 2 illustrates an example an example of the optical pickup 100 of FIG. 1.

Referring to FIG. 2, the optical pickup 100 includes a body 101 that may have a predetermined thickness. For example, the body 101 may be formed by aluminum die casting or a plastic mold. The optical pickup 100 also includes an object lens driving unit 200 which includes a protecting cover 229 that covers an object lens 11 and a peripheral portion of the object lens 11. In this example, the object lens driving unit 200 is formed in the body 101. According to the configuration shown in FIG. 1, the beam splitter 13, the light source 21, and the light-receiving device 32 are inserted and fixed to the body 101. A shaft guiding portion 102 includes a through-hole 102a into which a guide shaft (not shown) of an optical disc drive is inserted. The guide shafting portion 102 may be formed at one side of the body 101, similar to a structure of a general optical pickup.

Figure 3:
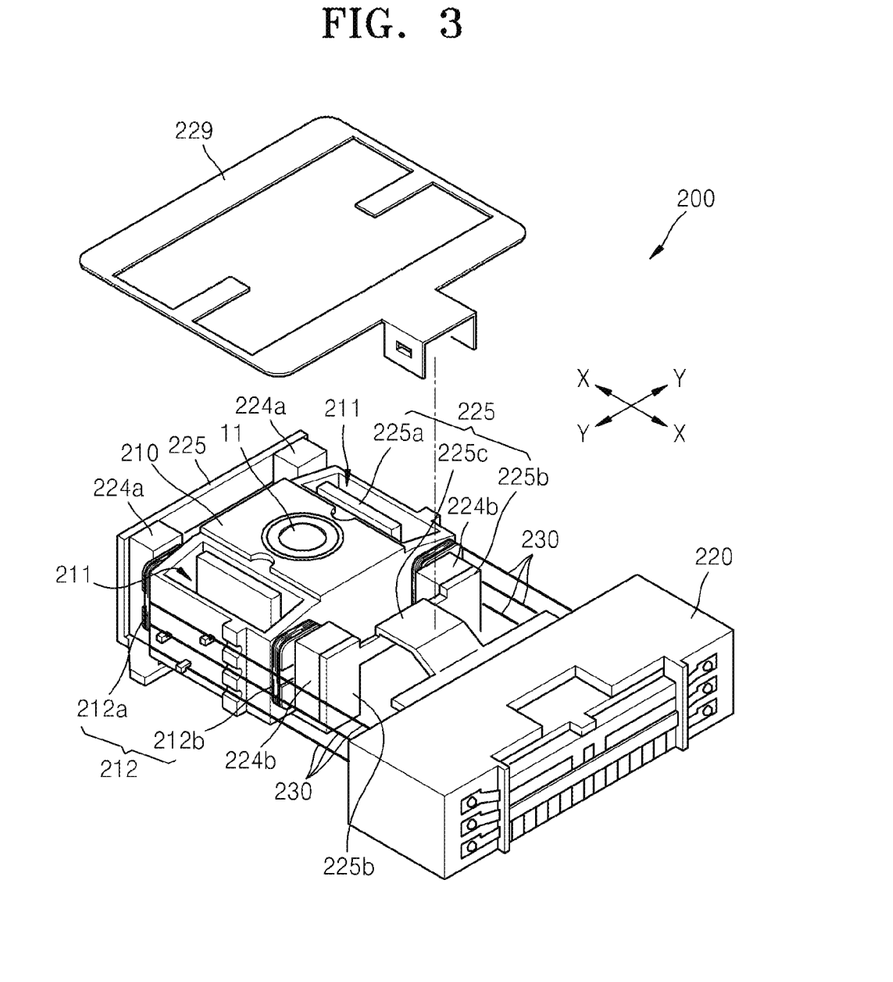
FIG. 3 is a diagram illustrating an example of an object lens driving unit used in the optical pickup of FIG. 2.
Figure 4:
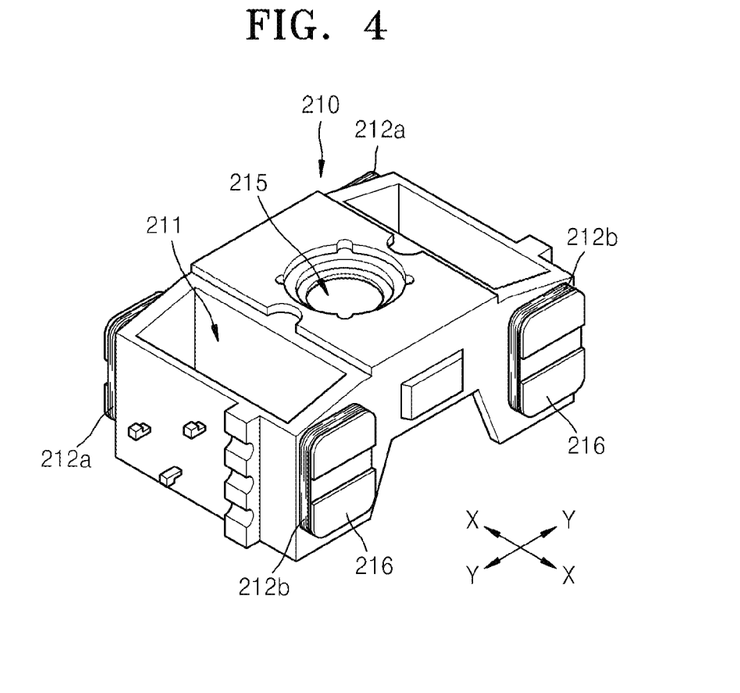
FIG. 4 is a diagram illustrating an example of a lens frame supporting an object lens in the object lens driving unit of FIG. 3.
Figure 5:
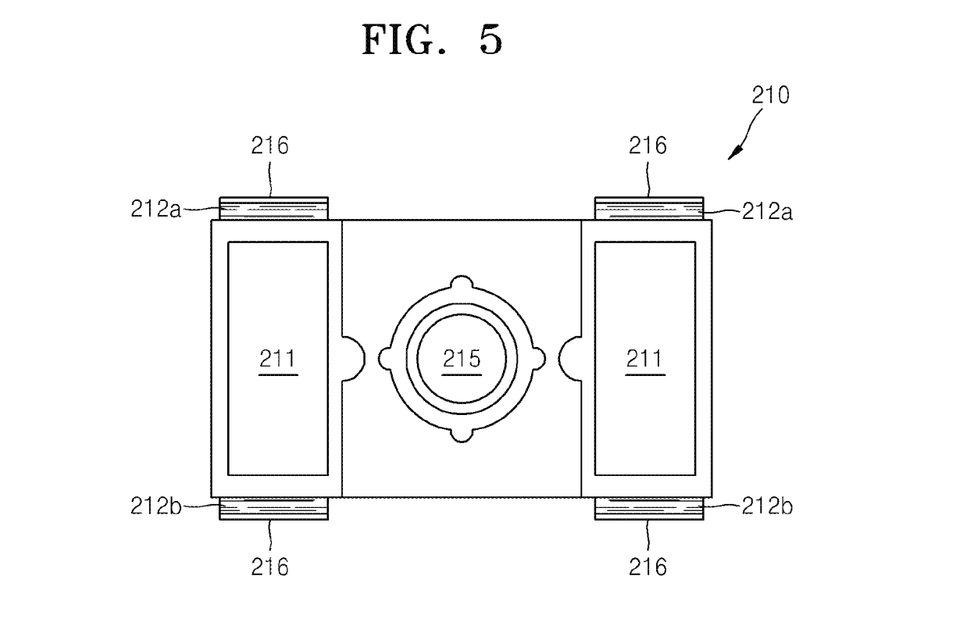
FIG. 5 is a diagram illustrating an example of the lens frame of FIG. 4.
Figure 6:
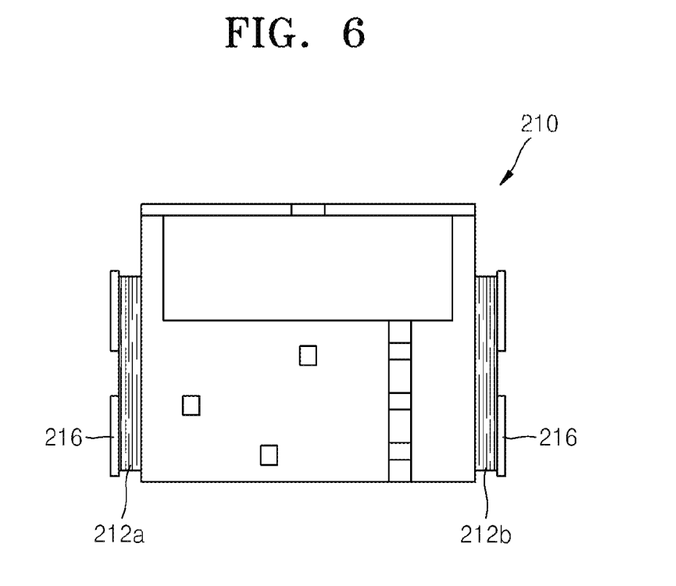
FIG. 6 is a diagram illustrating an example of a side view of the lens frame of FIG. 4.

FIG. 3 illustrates an example of the object lens driving unit 200 that is included in the optical pickup 100 shown in FIG. 2. FIG. 4 illustrates an example of a lens frame 210 supporting the object lens 11 in the object lens driving unit 200. FIG. 5 illustrates an example of the lens frame 210 and FIG. 6 illustrates an example of a side view of the lens frame 210.

Referring to FIG. 3, the object lens 11 is disposed in the center of a top surface of the lens frame 210, and a peripheral portion of the object lens 11 is covered by the protecting cover 229. A tetragonal through-hole 211 in which a center yoke 225a is disposed is formed at both sides of the lens frame 210 in a longitudinal (or tracking) direction (Y-Y). The lens frame 210 is electrically connected to a wire holder 220 via a plurality of suspension wires 230 that are fixed at both sides in the longitudinal direction (Y-Y). A driving coil structure 212 is fixed to the lens frame 210. The driving coil structure 212 is electrically connected to the suspension wires 230 extending in a lateral direction (X-X).

In the example of FIG. 3, a first end of each of the plurality of suspension wires 230 is fixed to the wire holder 220. The opposite end of each of the plurality of suspension wires is fixed to the first driving coils 212a. However, this is merely an example, and the suspension wires 230 may be fixed in various arrangements.

The driving coil structure 212 includes first and second driving coils 212a and 212b that are fixed to first and third side surfaces, respectively, of the lens frame 210 in a lateral direction (X-X). The suspension wires 230 are electrically connected to the first and second driving coils 212a and 212b. A yoke structure 225 includes the center yoke 225a, an outer yoke 225b, and a connecting unit 225c. The connecting unit 225c of the yoke structure 225 is fixed to the wire holder 220.

The object lens driving unit 200 includes a moving structure and a static structure. The moving structure includes the object lens 11 corresponding to a recording medium, the lens frame 210 supporting the object lens 11, and the driving coil structure 212 for focusing and tracking operations of the object lens 11. The driving coil structure 212 includes a pair of first driving coils 212a fixed to the first side surface of the lens frame 210 in the minor axis direction (X-X) and a pair of second driving coils 212b fixed to the third side surface of the lens frame 210. In this example, the first driving coils 212a run parallel to and face the second driving coils 212b.

The static structure includes a plurality of permanent magnets 224a and 224b, corresponding to the first and second driving coils 212a and 212b, the yoke structure 225, and the wire holder 220 supporting the yoke structure 225. The permanent magnets 224a and 224b are fixed to an inner surface of the outer yoke 225b and face the second driving coil 212b.

A pair of first driving coils 212a and a pair of second driving coils 212b are respectively disposed on the first side surface and the third side surface of the lens frame 210, as shown in FIGS. 4 to 6. For example, the pair of first driving coils 212a disposed on the first side surface may be focusing coils and the pair of second driving coils 212b disposed on the third side surface may be tracking coils. Therefore, the permanent magnets 224a and 224b that face the first driving coils 212a and the second driving coils 212b may form a focusing control magnetic field and a tracking control magnetic field. Alternatively, the first driving coils 212a may be tracking coils, and the second driving coils 212b may be focusing coils. In this example, the permanent magnets 224a and 224b that face the first driving coils 212a and the second driving coils 212b may form a tracking control magnetic field and a focusing control magnetic field.

In a conventional lens frame, a pair of focusing coils and a pair of tracking coils are diagonally disposed, or a focusing coil (including a tilt) and a tracking coil together are disposed on one side surface. When coils are arranged in a diagonal symmetric manner, warpage occurs in a diagonal direction of a lens frame, thereby resulting in malfunction such as tracking and focusing delays.

As can be seen in FIG. 4, the first and second driving coils 212a and 212b are directly wound around a coil winding unit 216 included in the lens frame 210, which is different from a conventional lens frame in which a driving coil is manufactured as a separate element and is separately attached to a lens frame. In addition, the lens frame according to various aspects is different from the conventional lens frame in that driving coils having the same function are attached to one side surface. In various aspects, a pair of focusing coils and a pair of tracking coils may be disposed on every side surface.

Figure 7:
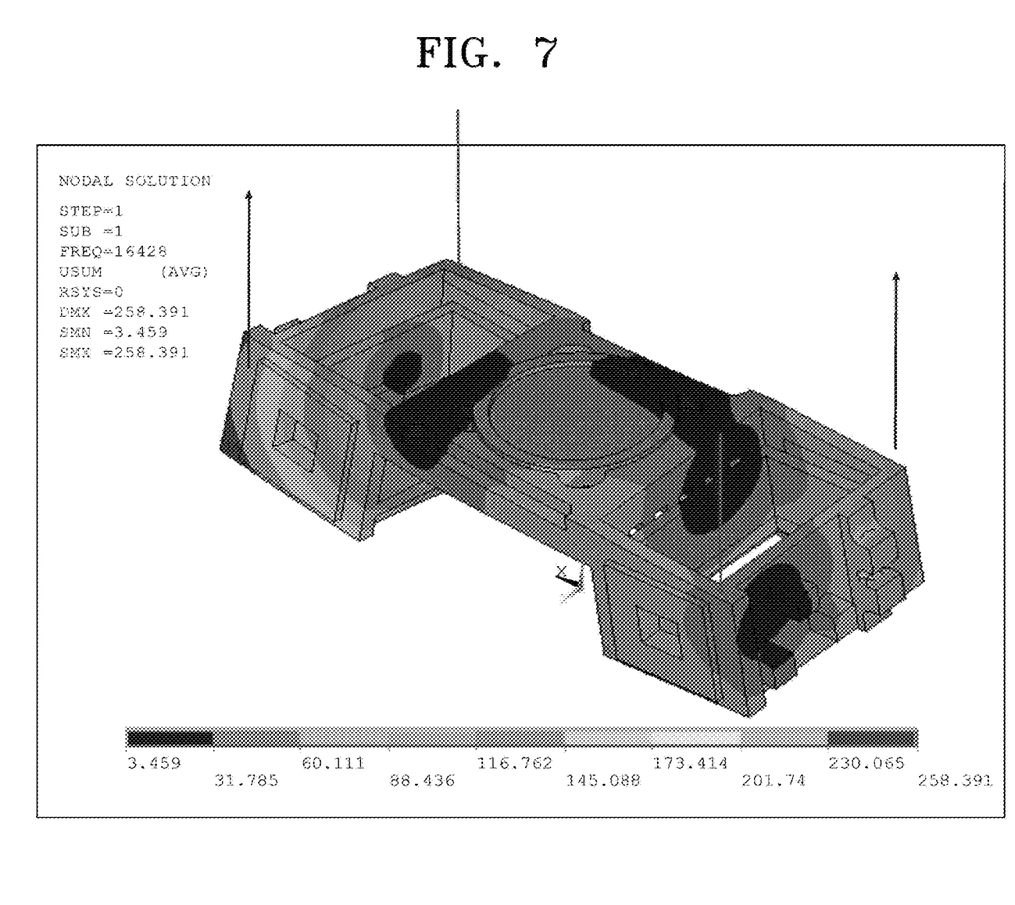
FIG. 7 is a diagram illustrating an example of a simulation result (nodal solution) of a lens frame in which coils are arranged in a diagonal symmetric manner.

FIG. 7 illustrates an example of a simulation result (modal analysis) of a lens frame in which coils are arranged in a diagonal symmetric manner.

Referring to FIG. 7, if focusing power and tracking power are applied in a diagonal direction of a lens frame, the lens frame may be warped. Furthermore, if the lens frame is formed of plastic, the lens frame may be further significantly warped. In order to solve the above-described problem, the lens frame may be formed of a metal, but in this case, manufacturing costs are increased. It is difficult to remove such a warpage when an external force is applied in such a way that a mode is generated. In other words, when a focusing coil is diagonally and symmetrically disposed, force is applied in a direction of a mode, thereby deteriorating a characteristic of the lens frame.

In an optical pickup actuator according to various aspects, a driving coil is disposed in a surface symmetric manner, and thus, warpage of a lens frame does not occur. Although some warpage may occur due to the surface symmetry may occur, the driving coils are formed on both surfaces of the lens frame in a minor axis direction (X-X) of the lens frame preventing additional warpage from occurring.

Figure 8:
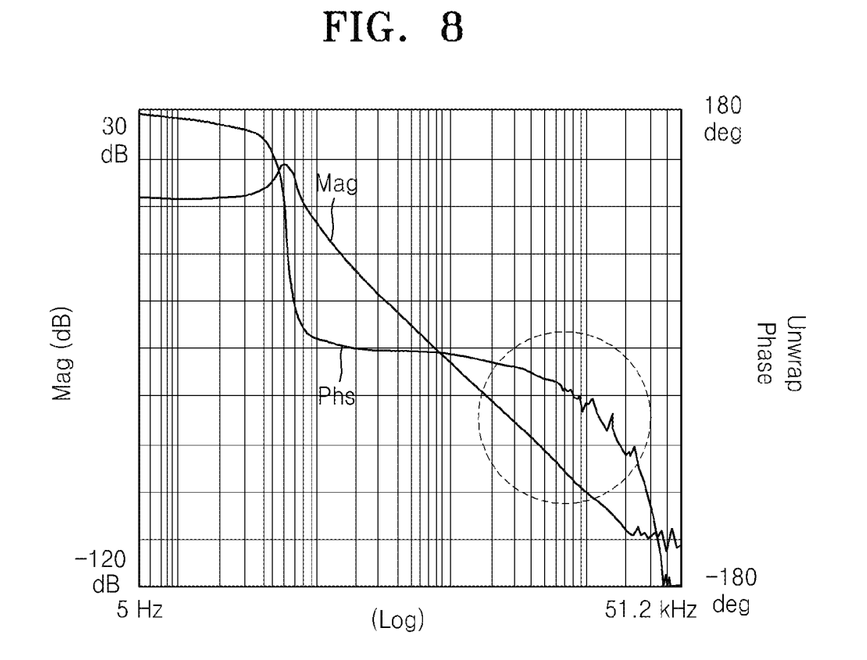
FIGS. 8 and 9 are graphs illustrating examples of frequency response characteristics of respective lens frames.
Figure 9:
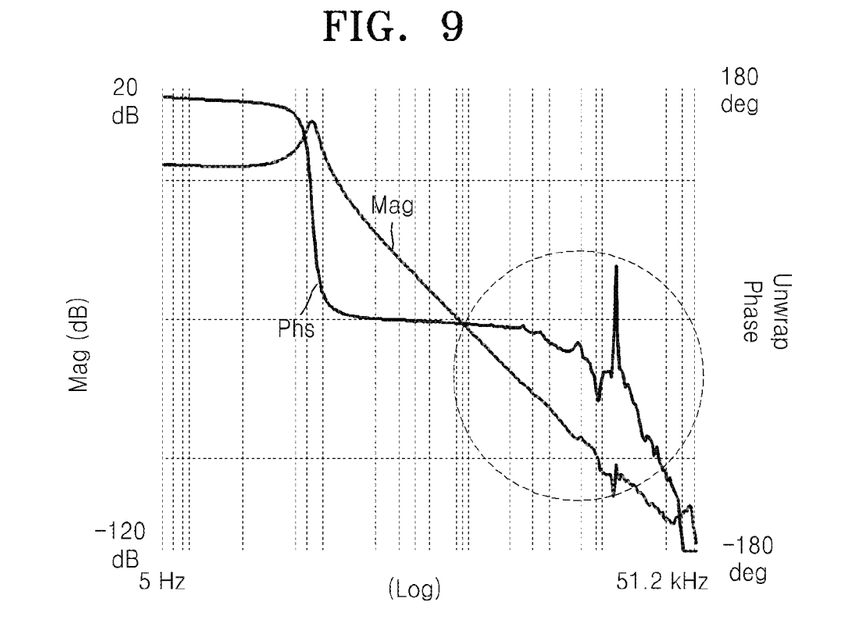

FIGS. 8 and 9 are graphs illustrating examples of frequency response characteristics of a lens frame in which coils are arranged in a surface symmetric manner and a conventional lens frame in which coils are arranged in a diagonal symmetric manner, respectively.

In particular, FIG. 8 is a graph illustrating an example of a frequency response characteristic when a focusing coil and a tracking coil are disposed together on a front surface of a lens frame. In the graph of FIG. 8, there is a little variation in a size (Mag) and a phase (Phs) around a high frequency of 10 Khz.

FIG. 9 is a graph illustrating an example of a frequency response characteristic when a focusing coil and a tracking coil are disposed in a diagonal symmetric manner. In this example, there is a significant variation in a size (Mag) and a phase (Phs) around a high frequency of 10 Khz. However, when the focusing coil and the tracking coil are disposed on the front surface of the lens frame, it is difficult to insert a winding unit due to restraints of a size of the lens frame. Accordingly, various aspects herein provide a method of obtaining a good frequency response characteristic and directly winding coils around a winding unit disposed in a lens frame when a focusing coil and a tracking coil are disposed on a front surface of the lens frame.

As shown in FIG. 9, the conventional lens frame shows significant variations in a size (resonance size) (Mag) and a phase (Phs) around a high frequency of 10 Khz. Thus, it is seen that the lens frame according to various aspects has better characteristics than the conventional lens frame.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A lens driving unit comprising:
    a lens frame comprising four side surfaces and an object lens that is disposed on a top surface of the lens frame;
    a pair of first driving coils that are wound around a first side surface of the lens frame;
    a pair of second driving coils that are wound around a third side surface facing the first side surface of the lens frame;
    a plurality of suspension wires which are electrically connected to the pair of first driving coils and the pair of second driving coils;
    a yoke comprising a plurality of magnets fixed thereto which correspond to the first and second driving coils; and
    a wire holder to which one side of the yoke and to which the suspension wires are fixed.

2. The lens driving unit of claim 1, further comprising a coil winding unit in which the pair of first driving coils and the pair of second driving coils are wound around the first and third side surfaces.

3. The lens driving unit of claim 2, wherein the coil winding unit is integrally formed in the lens frame.

4. The lens driving unit of claim 1, wherein the pair of first driving coils and the pair of second driving coils are tracking coils and focusing coils, respectively.

5. The lens driving unit of claim 1, wherein the first and third side surfaces of the lens frame have relatively large widths in comparison to the second and fourth side surfaces.

6. The lens driving unit of claim 1, wherein the lens frame corresponds to a slim-type optical disc drive.

7. An optical disc drive comprising:
- an object lens configured to face an optical recording medium;
- a light source configured to emit light toward the object lens;
- a light-receiving device configured to receive light reflected by the optical recording medium;
- a base for supporting the lens driving unit, the light source, and the light-receiving device; and
- a lens driving unit comprising:
    - a lens frame comprising four side surfaces and a top surface in which the object lens is disposed;
    - a pair of first driving coils wound around a first side surface of the lens frame;
    - a pair of second driving coils wound around a third side surface of the lens frame;
    - a plurality of suspension wires which are electrically connected to the pair of first driving coils and the pair of second driving coils;
    - a yoke comprising a plurality of magnets fixed thereto which correspond to the pairs of first and second driving coils; and
    - a wire holder to which one side of the yoke and to which the suspension wires are fixed.

8. The optical disc drive of claim 7, further comprising a coil winding unit in which the pair of first driving coils and the pair of second driving coils are wound around the first and third side surfaces.

9. The optical disc drive of claim 8, wherein the coil winding unit is integrally formed in the lens frame.

10. The optical disc drive of claim 7, wherein the pair of first driving coils and the pair of second driving coils are tracking coils and focusing coils, respectively.

11. The optical disc drive of claim 7, wherein the first and third side surfaces have relatively large widths in comparison to the second and fourth side surfaces.

12. The optical disc drive of claim 7, wherein the lens frame corresponds to a slim-type optical disc drive.

13. An optical lens driving unit for driving an optical lens in an optical disc drive, the optical lens driving unit comprising:
- a lens frame comprising the optical lens on a top surface, a first plurality of winding units on a first outer surface, and a second plurality of windings on a second outer surface;
- first driving coils wound around the first plurality of windings on the first outer surface of the lens frame;
- second driving coils wound around the second plurality of windings on the second outer surface of the lens frame; and
- a holder that comprises a plurality of suspension wires fixed thereto which are electrically connected to the first driving coils and the second driving coils.

14. The optical lens driving unit of claim 13, further comprising a yoke that comprises a first inner surface that faces the first outer surface of the lens frame, a second inner surface that faces the second outer surface of the lens frame, and a connector that fixes the yoke to the holder.

15. The optical lens driving unit of claim 14, wherein the first inner surface of the yoke comprises a first plurality of magnets which face the first driving coils, and the second inner surface of the yoke comprises second plurality of magnets which face the second driving coils.

16. The optical lens driving unit of claim 15, wherein the first driving coils and the first plurality of magnets perform focusing control of the optical lens, and the second driving coils and the second plurality of magnets perform tracking control of the optical lens, or vice versa.

\* \* \* \* \*